United States Patent
Frank et al.

(10) Patent No.: US 7,272,938 B2
(45) Date of Patent: Sep. 25, 2007

(54) SUPERCONDUCTING DEVICE WITH A COLD HEAD OF A REFRIGERATION UNIT WITH A THERMOSYPHON EFFECT THERMALLY COUPLED TO A ROTATING SUPERCONDUCTING WINDING

(75) Inventors: Michael Frank, Uttenreuth (DE); Wolfgang Nick, Nürnberg (DE); Peter van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 436 days.

(21) Appl. No.: 10/507,814

(22) PCT Filed: Mar. 12, 2003

(86) PCT No.: PCT/DE03/00794

§ 371 (c)(1),
(2), (4) Date: Sep. 14, 2004

(87) PCT Pub. No.: WO03/079522

PCT Pub. Date: Sep. 25, 2003

(65) Prior Publication Data

US 2005/0160744 A1 Jul. 28, 2005

(30) Foreign Application Priority Data

Mar. 14, 2002 (DE) ................. 102 11 363

(51) Int. Cl.
*F25B 9/00* (2006.01)
*F25D 23/12* (2006.01)
*F17C 3/10* (2006.01)
*F28D 15/00* (2006.01)

(52) U.S. Cl. ............................ 62/6; 62/259.2; 62/48.2; 165/104.21

(58) Field of Classification Search ............... 62/6, 62/259.2, 51.1, 48.2; 165/104.21
See application file for complete search history.

(56) References Cited

U.S. PATENT DOCUMENTS 3,683,640 A * 8/1972 Eber ........................... 62/333
4,538,417 A * 9/1985 Eckels ........................ 62/50.7

(Continued)

FOREIGN PATENT DOCUMENTS

DE 10039964 A1 3/2002

(Continued)

OTHER PUBLICATIONS

Haruyama et al., Proceedings of the Sixteenth International Cryogenic Engineering Conference/International Cryogenic Materials Conference, Kitakyushu, Japan, May 20-24, 1996, pp. 1109-1129.

*Primary Examiner*—William C Doerrler
(74) *Attorney, Agent, or Firm*—Staas & Halsey LLP

(57) ABSTRACT

The superconducting winding comprises a rotor which may rotate about a rotation axis with a superconducting winding in a thermally conducting winding support. The winding support comprises a central coolant cavity, with a lateral cavity leading out of the winding support connected thereto. A cold head of a refrigeration unit is connected to a condenser unit for condensing refrigerant and is arranged outside the rotor. A fixed heat tube, supplying the refrigerant, is coupled to the condenser unit, extending axially into the rotating lateral cavity and is sealed relative to the cavity. The refrigerant is a mixture of several components having different condensation temperatures.

22 Claims, 2 Drawing Sheets

U.S. PATENT DOCUMENTS

| | | |
|---|---|---|
| 5,482,919 A | 1/1996 | Joshi |
| 6,186,755 B1 * | 2/2001 | Haga ......................... 418/55.1 |
| 6,376,943 B1 * | 4/2002 | Gamble et al. ............... 310/52 |
| 6,489,701 B1 * | 12/2002 | Gamble et al. ............. 310/179 |
| 6,812,601 B2 * | 11/2004 | Gamble et al. ............... 310/52 |
| 2004/0056541 A1 | 3/2004 | Steinmeyer |
| 2005/0155356 A1 * | 7/2005 | Frank et al. .................... 62/6 |

FOREIGN PATENT DOCUMENTS

WO      WO02/43224 A1      5/2002

* cited by examiner

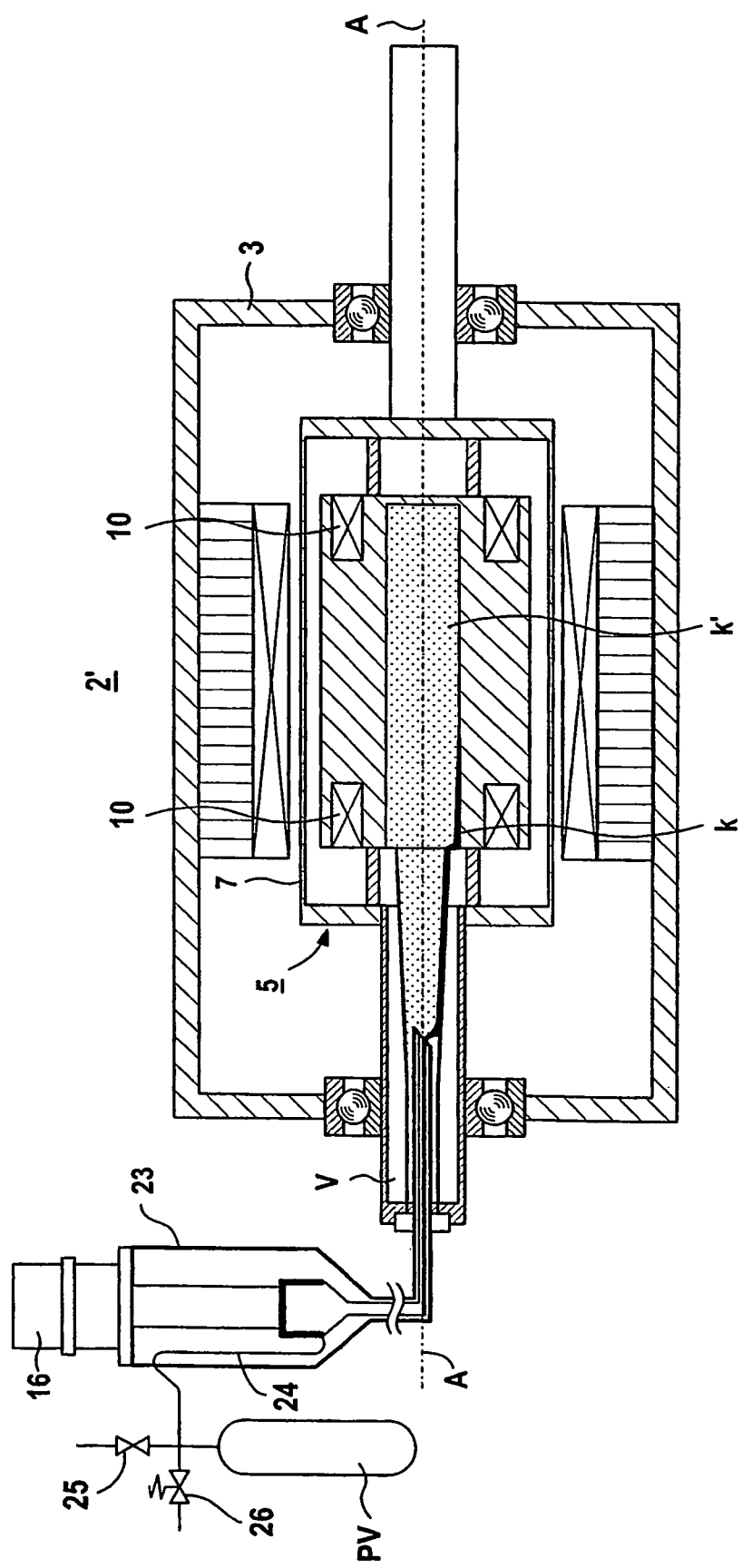

SUPERCONDUCTING DEVICE WITH A COLD HEAD OF A REFRIGERATION UNIT WITH A THERMOSYPHON EFFECT THERMALLY COUPLED TO A ROTATING SUPERCONDUCTING WINDING

CROSS REFERENCE TO RELATED APPLICATIONS

This application is based on and hereby claims priority to PCT Application No. PCT/DE03/00794 filed on Mar. 12, 2003 and German Application No. 102 11 363.7 filed on Mar. 14, 2002, the contents of which are hereby incorporated by reference.

BACKGROUND OF THE INVENTION

The subject matter of the Patent Application in accordance with WO 02/43224 A1 with the priority date Nov. 21, 2000 and entitled "Supraleitungseinrichtung mit einem thermisch an eine rotierende, supraleitende Wicklung angekoppelten Kaltkopf einer Kälteeinheit" [Superconducting device having a cold head, which is thermally coupled to a rotating, superconducting winding, of a refrigeration unit], which was not published prior to this, is a special superconducting device with a rotor which is mounted such that it can rotate about a rotation axis and has at least one superconducting winding with conductors (which are arranged in a thermally conductive winding mount) as well as a refrigeration unit, in which at least one cold head is thermally coupled via thermally conductive parts to the winding, making use of a thermosyphon effect.

In addition to metallic superconductor materials such as NbTi or $Nb_3Sn$ which have been known for a long time and have very low critical temperatures $T_c$ and which are therefore also referred to as low $T_c$ superconductor materials or LTS materials, metal-oxide superconductor materials with critical temperatures above 77 K have been known since 1987. The latter materials are referred to as high-$T_c$ superconductor materials, or HTS materials, and in principle allow a refrigeration technique using liquid nitrogen ($LN_2$).

Attempts have also been made to create superconducting windings with conductors using such HTS materials. However, it has been found that already known conductors can carry only a comparatively small amount of current in magnetic fields with inductions in the Tesla range. This often means that it is necessary to keep the conductors of windings such as these at a temperature level below 77 K, for example between 10 and 50 K, despite the intrinsically high critical temperatures of the materials being used in order in this way to make it possible to carry significant currents at field strengths of several Tesla. A temperature level such as this is admittedly on the one hand considerably higher than 4.2 K, the boiling temperature of liquid helium (LHe) with which known metallic superconductor elements such as $Nb_3Sn$ are cooled. On the other hand, however, cooling with $LN_2$ is uneconomic due to the high conductor losses. Other liquefied gases such as hydrogen with a boiling temperature of 20.4 K or neon with a boiling temperature of 27.1 K cannot be used owing to their danger or their lack of availability.

Refrigeration units in the form of cryogenic coolers with closed helium compressed gas circuits are therefore preferably used for cooling windings with HTS conductors in the temperature range. Cryogenic coolers such as these are, in particular, in the form of the Gifford-McMahon or Stirling type, or are in the form of so-called pulse tube coolers. Refrigeration units such as these also have the advantage that the refrigeration performance is available virtually at the push of a button, and there is no need for the user to handle cryogenic liquids. When refrigeration units such as these are used, a superconducting device such as a magnet coil or a transformer winding is cooled only indirectly by heat conduction to a cold head of a refrigerator (see, for example, "Proc. 16$^{th}$ Int. Cryog. Engng. Conf. (ICEC 16)", Kitakyushu, JP, May 20-24 1996, Verlag Elsevier Science, 1997, pages 1109 to 1129).

A corresponding cooling technique is also provided for a superconducting rotor of an electrical machine which is disclosed in U.S. Pat. No. 5,482,919 A. The rotor contains a rotating winding composed of HTS conductors, which can be kept at a desired operating temperature of between 30 and 40 K by a refrigeration unit which is in the form of a Stirling, Gifford-McMahon or pulse tube cooler. In a specific embodiment for this purpose, the refrigeration unit contains a cold head which also rotates, is not described in any more detail in the document, and whose colder side is thermally coupled to the winding indirectly, via elements which conduct heat. Furthermore, the refrigeration unit of the known machine contains a compressor unit which is located outside its rotor and supplies the cold head with the necessary working gas via a rotating coupling, which is not described in any more detail, of a corresponding transfer unit. The coupling also supplies the necessary electrical power via two sliprings to a valve drive, which is integrated in the cold head, of the refrigeration unit. This concept makes it necessary for at least two gas connections to be routed coaxially in the transfer unit and means that it is necessary to provide at least two electrical sliprings. Furthermore, the accessibility to the rotating parts of the refrigeration unit and, in particular, to the valve drive in the rotor of the machine is impeded, since the rotor housing must be open when servicing is necessary. Furthermore, the operation of a known valve drive with fast rotation, as in the case of synchronous motors or generators, is not assured.

In order to ensure reliable and economic operation of a refrigeration unit both when the rotor is at rest and when it is rotating, in a temperature range below 77 K and with less hardware complexity, the subsequently published patent application according to WO 02/43224 A1 proposes the following features for the superconducting device of the type mentioned initially:

the winding mount should be equipped with a central, cylindrical cavity which extends in the axial direction and to which a lateral cavity is connected which leads out of the winding mount, the cold head should be located in a fixed manner outside the rotor and thermally connected to a condenser unit for condensation of a refrigerant, a stationary heat pipe should be coupled to the condenser unit, which pipe projects axially into the corotating lateral cavity and seals off this area radially, and the heat pipe, the lateral cavity and the central cavity should be filled with coolant, with condensed refrigerant being passed, when making use of the thermosyphon effect, via the heat pipe into the lateral cavity and from there into the central cavity, and refrigerant which is vaporized there being passed back via the lateral cavity and the heat pipe to the condenser unit.

In consequence, in this refinement of the proposed superconducting device, the entire refrigeration unit is arranged with any moving parts outside the rotor, and is thus easily accessible at any time. The refrigeration power and the heat transfer are provided by a stationary cold head in the rotor via the heat pipe, which ensures that the refrigerant is transported without any mechanically moving parts. In this case, the refrigerant is condensed, with heat being emitted, in a circulating process in a condenser unit, which is connected in a highly thermally conductive manner to the cold head. The liquid condensate then runs through the heat pipe into the lateral cavity and from there into the central cavity in the rotor. The condensate is transported through the heat pipe under the influence of the force of gravity on the basis of a so-called thermosyphon effect, and/or by the capillary force of the inner wall of the heat pipe. In this context, this pipe acts in a manner which is known per se as a "wick". This function can also be optimized by appropriate refinement or cladding of the inner wall. The condensate drips into the lateral cavity at the end of the heat pipe. This condensate, which is passed from this lateral cavity into the central cavity, which is located in the region of the winding, is at least partially vaporized there. The refrigerant, which is vaporized in this way with heat being absorbed, then flows through the interior of the heat pipe back into the condenser device. The return flow is in this case driven by a slight overpressure in the central cavity, which acts as an evaporator part, relative to the parts of the condenser unit which act as a condenser. This reduced pressure, which is produced by the creation of gas in the evaporator and by the liquefaction in the condenser, leads to the desired refrigerant return flow. Corresponding refrigerant flows are known from so-called heat pipes.

The advantages of this refinement are, inter alia, that there is no need for any moving parts, such as fans or pumps, to circulate the refrigerant. Furthermore, only a single thermally insulating heat (transport) pipe, which can be designed to be relatively thin, is required to circulate the refrigerant. This reduces the complexity, particularly of the rotating seal, which seals the gas area of the refrigerant from the external area of the rotor. A seal, which is thus only comparatively small, is more reliable and requires less servicing since its circumferential speed is lower. In this case, gas losses of the refrigerant from the internal area to the external area have no significant influence on the operation of the heat pipe, since the amount of liquid in the system is effected only to a minor extent. In consequence, long lives can be achieved with an adequate reservoir size. Furthermore, the refrigeration unit can easily be matched to the different requirements of machine installation. In particular, depending on the configuration, a heat pipe with a length of many meters can be provided so that, for example, a refrigeration machine can be installed at an accessible point in order to simplify its servicing, while the actual motor or generator is installed in a location where access is difficult. The heat transfer and the provision of the refrigeration power are thus particularly simple and economic with the refinement, in particular since only a comparatively simple seal is required.

When cooling a superconducting rotor down from room temperature to the operating temperature by a cold head which is connected via only one thermosyphon, as is envisaged in the proposed superconducting device, the power of the cold head is relatively low at the low operating temperature of the thermosyphon, which is typically about 30 K. This results in correspondingly long cooling-down times. This is because, in a cooling system with only one thermosyphon, it is either necessary to tolerate a cooling-down time on the scale of roughly one or more weeks—depending on the cold mass and the refrigeration power—or the thermosyphon must be temporarily filled with a different working gas for initial cooling of the rotor, thus allowing a higher operating temperature. The latter procedure would necessitate several hours of maintenance work during a cooling-down process. However, this should be avoided, for logistics and cost reasons.

SUMMARY OF THE INVENTION

One possible object of the present invention is therefore to develop the proposed superconducting device so as to at least reduce the problems described above. The inventors suggest that a mixture of at least two refrigerant components with different condensation temperatures should be provided as the refrigerant.

In the case of the superconducting device, the gas having the highest condensation temperature can in consequence be condensed first with the cold head being cooled down gradually, with a closed circuit being formed for heat transmission to those parts of the rotor which are to be cooled. After initial cooling of these rotor parts down to the triple point temperature of this gas, this gas will freeze out in the area of the condenser unit, as a result of which the condenser unit will be cooled down to the condensation temperature of the next gas mixture component. The individual components of the gas mixture can in this case be selected so as to advantageously achieve virtually continuous cooling down, with optimum utilization of the refrigeration power of the cold head. This is because the operation of the cold head at a higher temperature at the start of the cooling-down process leads to a considerably greater refrigeration power, and thus allows considerably shorter cooling-down times.

It is thus possible to seal the refrigerant area in a particularly simple manner, such that the central cavity is closed on one side by the winding mount, and the lateral cavity is sealed on the side facing the cold head by a sealing device with rotating parts. In this case, at least one seal from the group of ferro fluid seals, labyrinth seals, gap seals may be used as the sealing device.

Virtually any type of refrigeration machine may be provided as the refrigeration unit which have a cold head which can be kept at a predetermined temperature level. Cryogenic coolers, in particular those with a dosed helium compressed gas circuit, are preferably provided, since their design is simple and they are particularly suitable for an indirect cooling technique as in the case of the superconducting device.

Appropriate coolers, which are also referred to as regenerative cryogenic coolers, have a regenerator or regenerative operating cycle corresponding to the normal classification of cryogenic coolers (see, for example, the cited Proceedings volume, pages 33 to 44).

The cold head can particularly advantageously be designed to have two or more stages. In particular, parts of an electricity supply or a thermal radiation shield can then in particular be kept at a comparatively high intermediate temperature by its first stage. An appropriately designed cold head thus allows stationary parts of the superconducting device in each case to be kept at a temperature level which is advantageous for effective cooling, in a simple manner.

Furthermore, it may be regarded as being advantageous if the winding to be cooled, and thus its superconductor material, can be kept at a temperature below 77 K, preferably between 20 and 50 K when using HTS material. This is because known HTS materials have a critical current density that is sufficient for normal applications in this temperature range, which can be maintained with comparatively limited cooling effort. The required refrigeration power can be applied without problems for the superconducting device. By way of example, it is in the range from a few tens of watts at 20 K to 30 K for a synchronous machine of a size equivalent to a mechanical power of about 1 to 20 MW.

It is also advantageous for the heat pipe to be formed as a dripping edge at its end which projects into the lateral cavity or into the central cavity. This makes it easier for the respective condensate to enter the cavity. The refinement can also be implemented in such a way that the process of the droplets dripping off is assisted by rotation, by the gas movement in the rotating internal area resulting from the wind formed by the gaseous part of the refrigerant.

Furthermore, it may be regarded as being advantageous for the lateral cavity to widen in the direction of the central cavity. This is because it may also be possible to make use of the force of gravity or centrifugal force to assist the transport of the refrigerant, with the transport route of the refrigerant thus being inclined such that it points outward with respect to the rotation axis.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows one specific refinement of this device as shown in FIG. 1.

DETAILED DESCRIPTION OF THE PREFERRED EMBODIMENT

Figure 1:
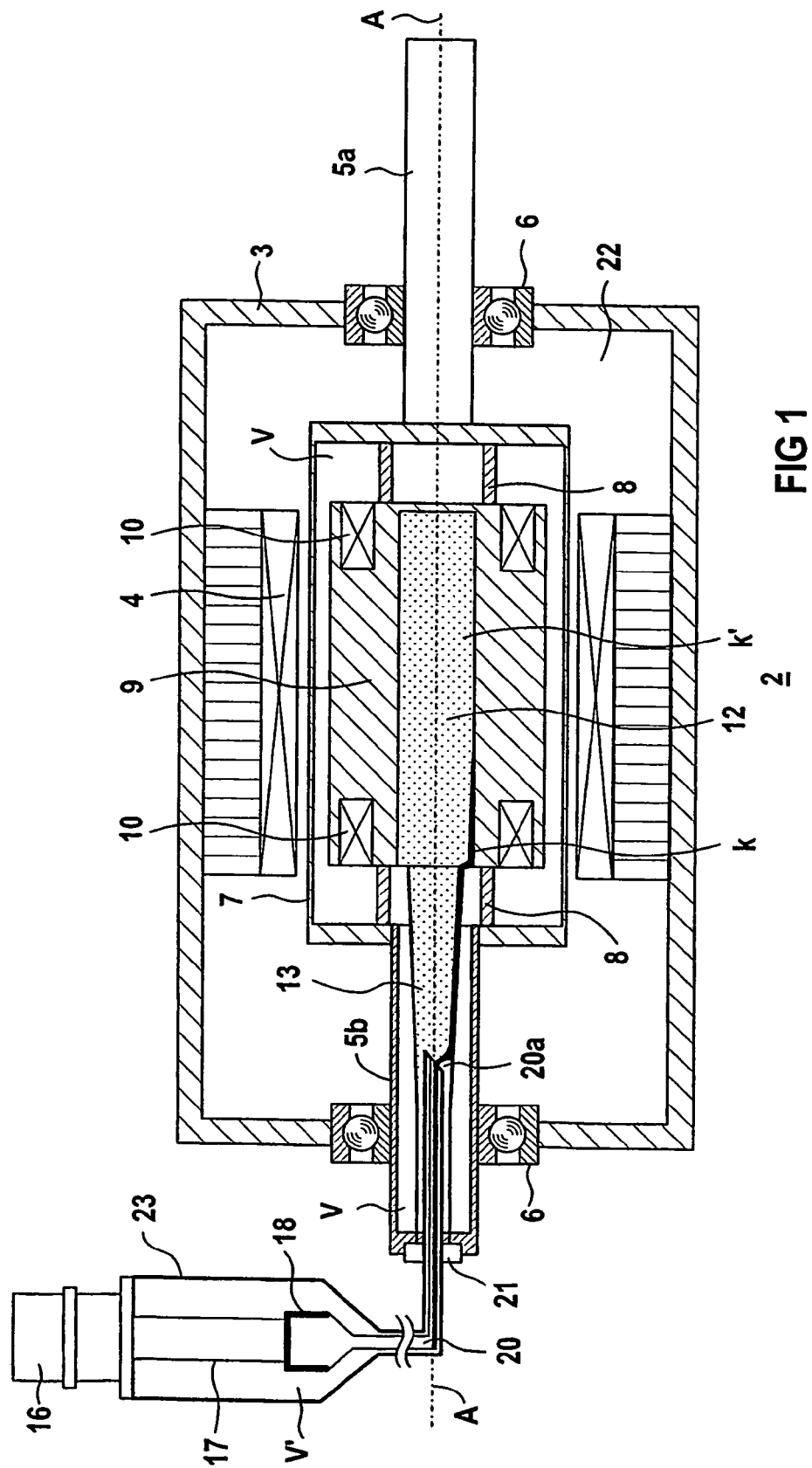
FIG. 1 shows an embodiment of a superconducting device having a rotor and an associated refrigeration unit.

Reference will now be made in detail to the preferred embodiments of the present invention, examples of which are illustrated in the accompanying drawings, wherein like reference numerals refer to like elements throughout.

Corresponding parts are provided with the same reference symbols in the figures.

The embodiments of superconducting devices described in the following text with reference to the figures may each in particular relate to a synchronous motor or a generator. The superconducting device has a rotating, superconducting winding, which in principle allows the use of metallic LTS material (low-$T_c$ superconductor material) or oxidic HTS material (high-$T_c$ superconductor material). The following exemplary embodiments assume that the latter material has been chosen. The winding may comprise a coil or a system of coils in a 2-pole, 4-pole or other multipole arrangement. The basic configuration of a superconducting device such as this, which, for example, is in the form of a synchronous machine, is shown in FIG. 1, based on the assumption of known embodiments of such machines (see, for example, the cited document U.S. Pat. No. 5,482,919 A).

The device, which is denoted in general by 2, has a stationary outer housing 3, which is at room temperature, with a stator winding 4. A rotor 5 is mounted in bearings 6 within the outer housing, and surrounded by the stator winding 4, such that it can rotate about a rotation axis A, and on one side has a solid axial rotor shaft part 5a which is mounted in the corresponding bearing. The bearings 6 may be known mechanical bearings or else magnetic bearings. The rotor has a vacuum vessel 7 in which a winding mount 9 with an HTS winding 10 is held on, for example, hollow cylindrical suspension elements 8 which transmit torque. A cylindrical cavity which extends in the axial direction and is referred to in the following text as the central cavity 12 is provided concentrically with respect to the rotation axis A in this winding mount. The winding mount is in this case designed to be vacuum-tight with respect to this cavity. It closes this cavity on the side facing the rotor shaft part 5a. On the other side, the central cavity 12 is connected to a lateral cavity 13, with a comparatively small diameter. This lateral cavity passes to the exterior out of the area of the outer housing 3 from the area of the winding mount. A tubular rotor shaft part which surrounds this lateral cavity 13 and is mounted in one of the bearings 6 is annotated 5b.

For indirect cooling of its winding 10 via thermally conductive elements, the superconducting device 2 also has a refrigeration unit, of which only a cold head 16 is illustrated. The refrigeration unit may, in particular, be a cryogenic cooler of the Gifford-McMahon type. A pulse tube cooler or split-Stirling cooler is preferably chosen as a regenerative cryogenic cooler. In this case, the cold head 16 and hence all the major further parts of the refrigeration unit should be located outside the rotor 5 and outside the outer housing 3. Additional parts which are required for the refrigeration unit together with the cold head that is to be used, such as hot pressure equalizing containers, filling capillaries, overpressure valves to protect the system against overpressure on heating up, are not shown in the figure but are generally known. The cold part of the cold head 16, which is arranged, by way of example, at a distance of 0.5 up to about a meter to the side of the rotor 5, makes good contact with a refrigerant condenser unit or condensation unit 18 in a vacuum vessel 23 via a body 17 which conducts heat. This condenser unit is connected to a vacuum-insulated, fixed-position heat pipe 20 which projects into the lateral, rotating cavity 13 or the central cavity 12 at the side in an axial area. A sealing device 21, which is not shown in any more detail in the figure but has at least one sealing element which may be in the form of a ferro fluid seal and/or a labyrinth seal and/or a gap seal is used to seal the heat pipe 20 from the lateral cavity 13. The central cavity 12 is connected via the heat pipe 20 and the lateral cavity 13 to the heat exchanging area of the condenser unit 18 such that it is sealed in a gastight manner from the exterior.

A refrigerant which is enclosed in these areas should be composed of a mixture of at least two different elementary components with different boiling or condensation temperatures $T_k$. In this case, a first of the two mixture components should have a first condensation temperature $T_{k1}$ which, in general, is below the operating temperature envisaged for continuous operation of the superconducting winding. Depending on the operating temperature, this first mixture component may, for example, be hydrogen (condensation temperature 20.4 K at normal pressure, triple point 14 K, critical point 30 K and 8 bar), neon (condensation temperature 27.1 K at normal pressure, triple point 25 K, critical point 42 K and 20 bar), nitrogen (condensation temperature 77.4 K at normal pressure, triple point 65 K, critical point 125 K and 22 bar) or argon (condensation temperature 87.3 K at normal pressure, triple point 85 K, critical point 145 K and 38 bar). The second elementary mixture component should, in contrast, have a higher condensation temperature $T_{k2}$. Corresponding examples for refrigerant mixtures are the component pair neon ($T_{k1}$ of 27.1 K) and argon ($T_{k2}$ of 87.3 K) or the component pair neon and nitrogen ($T_{k2}$ of 77.4 K) if the intended operating temperature will be below $T_{k2}$ and is, for example, about 30 K.

The cooling process when the superconducting device is in the normal operating state will be described first of all in the following text: in this case, both components of the refrigerant mixture which are enclosed in the refrigerant areas are condensed in a circulating process in the condenser unit, which is cooled by the cold head 16, with heat being emitted. The condensate, which has been liquefied in this way, is annotated k and is indicated by a thickened line in the figure, then flows through the heat pipe 20, first of all into the lateral cavity 13 and from there into the central cavity 12. The condensate is in this case transported through the heat pipe by a thermosyphon effect under the influence of the force of gravity and/or a capillary force on the inner wall of the heat pipe, which acts as a "wick". The function of a wick such as this can be optimized by appropriate configuration, for example with the aid of longitudinal ribs or channels to enlarge the surface area, or by cladding of the internal wall. The condensate k then drips into the cavity 13 or 12 at that end 20a of the heat pipe 20 which projects into the lateral cavity 13 or, if appropriate, into the central cavity 12, and it is possible to reinforce this process by forming a dripping edge at the end 20a of the pipe. The formed region can also be configured such that the dripping process is assisted by gas movement in the rotating internal area, on the basis of the wind from the gaseous part of the refrigerant, by rotation.

Only the first component k whose condensation temperature is $T_{k1}$, or the neon, in the liquid refrigerant mixture or condensate k is then vaporized in the interior of the rotor. This refrigerant component, which is now in the form of vapor, is annotated k'. The second component in this case remains liquid as before or is frozen. The force of gravity or centrifugal force can possibly still be used to transport the refrigerant, if the transport route of the refrigerant is inclined pointing outwards with respect to the rotation axis. For this purpose, the lateral cavity 13 is configured as a tube whose diameter extends in the direction of the central cavity 12. The refrigerant component k', which evaporates with heat being absorbed, then flows through the interior of the heat pipe 20 back into the condenser unit 18. In this case, the return flow is driven by a slight overpressure in the cavity 12, which acts as an evaporator relative to the condenser unit, caused by the production of gas in the evaporator and the liquefaction in the condenser unit.

A heat pipe which is coupled in a stationary manner to a refrigeration machine is thus provided for the superconducting device. In this case, the refrigerant is passed to the cryogenic area, with the transition between stationary and rotating parts being made by dripping liquid, and the return path being made by flowing gas.

The cooling process during the cooling-down phase is explained below:

Since the intended refrigerant is a mixture of at least two refrigerant components with different condensation temperatures, the second component, with the highest condensation temperature (in this case: $T_{k2}$) will be condensed first during gradual cooling down of the cold head, with a closed circuit being formed as in the case of the first component during the normal operating state for heat transmission to the parts of the rotor which are to be cooled. After corresponding initial cooling of these parts down to the triple point temperature of this second component, this will then freeze out in the area of the condenser unit, as a result of which this will be cooled down to the condensation temperature of the next (first) refrigerant component. With a suitable choice of the mixture of the refrigerant components, this allows virtually continuous cooling down to be achieved, with optimum utilization of the refrigeration power of the cold head.

The winding former 9 should be designed to be sufficiently thermally conductive; that is to say it has highly thermally conductive parts between its wall to the central cavity 12 and the winding 10. In this way, the winding is thermally coupled to the cold head 16 of the refrigeration unit in a simple manner via the winding former 9, the refrigerant k and k', the condenser unit 18 and the body 17 which conducts heat. If necessary, the heat conduction can be improved by measures to enlarge the heat exchanging surfaces for the gaseous refrigerant k', for example by providing ribs in the circumferential direction on the winding mount wall of the central cavity 12.

In order to transport the liquid phase of the refrigerant k better within the heat pipe 20, this can also be equipped in a manner known per se with fittings in the form of the "wick" which has been mentioned, for example with a stainless steel wire foam or a surface whose area has been enlarged by grooves. In addition to the transport of the liquid phase, as illustrated in the figure, in the horizontal part of the heat pipe 20, transportation against the force of gravity is, of course, also possible.

The parts/containers which surround the refrigerant k or k' must, of course, be protected against the conducted ingress of heat. A vacuum surround is therefore expediently provided as thermal insulation for them, in which case, if necessary, additional insulation material such as superinsulation or insulation foam can also be provided in the corresponding vacuum areas. The vacuum which is enclosed by the vacuum vessel 7 is annotated V in FIG. 1. This also surrounds the tube which encloses the lateral cavity 13 and extends as far as the seal 21. The vacuum which surrounds the heat pipe 20 as well as the condenser device 18 and the body 17 which conducts heat is annotated V'. If required, a reduced pressure can also be produced in the area 22 which surrounds the rotor 5 and encloses the outer housing 3.

In the embodiment of a superconducting device 2 with a rotor 5 as illustrated in FIG. 1, the device 2 is filled on a one-off basis with gaseous refrigerant k'. When the refrigeration unit is switched off and the cold parts heat up, the pressure in the tube and cavity system will rise due to vaporization of the refrigerant. In this case, the final pressure depends on the enclosed volumes and the amount of refrigerant in the system. If, by way of example, neon at about 1 bar and 27 K and with a minimal amount of liquid k is used as first component of the refrigerant mixture, it can be assumed that the pressure will be more than 12 bar after heating up to room temperature at about 300 K. Since this pressure places a load on the rotating seal 21, it may if required be advantageous to provide an external, hot buffer volume. If this volume PV is n-times the cold volume of the refrigerant k, k', the pressure rise when hot can be reduced to 1:(n+1) times, in this way. FIG. 2 shows a corresponding configuration of the superconducting device as shown in FIG. 1. There, 2' denotes the entire superconducting device, PV the buffer volume, 25 a filling valve, from which the system can be filled with gaseous refrigerant k' via a filling capillary 24, and 26 denotes a pressure relief valve. The other parts of the machine correspond to those in the embodiment of the superconducting device 2 shown in FIG. 1.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

The invention claimed is:

1. A superconducting device comprising:
a rotor which is mounted to rotate about a rotation axis extending in an axial direction, the rotor comprising:
a thermally conductive winding mount;
a cylindrical, central cavity which extends in the axial direction, the central cavity being connected to a lateral cavity which rotates with the rotor and which leads out of the winding mount; and
a superconducting winding having conductors arranged in the winding mount; and
a refrigeration unit having a cold head which is thermally coupled to the winding mount, the refrigeration unit being located outside the rotor such that the rotor rotates with respect to the refrigeration unit, the refrigeration unit having a condenser unit to condense a refrigerant; and
a stationary heat pipe coupled to the condenser unit, which heat pipe projects axially into the lateral cavity and is radially sealed to the lateral cavity, wherein
the heat pipe, the lateral cavity and the central cavity are filled with the refrigerant, with condensed refrigerant being passed through a thermosyphon effect to the central cavity via the heat pipe and the lateral cavity, and with vaporized refrigerant being passed from the central cavity to the consenser unit via the lateral cavity and the heat pipe, and
the refrigerant is a mixture of at least two refrigerant components with different condensation temperatures.

2. The device as claimed in claim 1, wherein
the central cavity is closed on one side by the winding mount, and
the lateral cavity is sealed with respect to the heat pipe by a sealing device having parts which rotate with the lateral cavity and the rotor.

3. The device as claimed in claim 2, wherein the sealing device has at least one seal selected from the group consisting of ferro fluid seals, labyrinth seals, and gap seals.

4. The device as claimed in claim 1, wherein the refrigeration unit has a regenerative cryogenic cooler.

5. The device as claimed in claim 4, wherein the regenerative cryogenic cooler comprises at least one cooler selected from the group consisting of a pulse tube cooler, a split Stirling cooler, and a Gifford-McMahon cooler.

6. The device as claimed in claim 1, wherein the cold head is a multistage cold head.

7. The device as claimed in claim 6, wherein the cold head has two refrigeration stages, with the first stage being thermally connected to an electricity supply or to a radiation shield, and the second stage being thermally connected to the condenser.

8. The device as claimed in claim 1, wherein the cold head maintains superconducting winding at a temperature of below 77 K.

9. The device as claimed in claim 1, wherein the superconducting winding is formed from a metallic low-$T_c$ superconductor material or a metal-oxide high-$T_c$ superconductor material.

10. The device as claimed in claim 1, wherein the heat pipe has a dripping edge which projects into the lateral cavity or the central cavity.

11. The device as claimed in claim 1, wherein the lateral cavity widens from the heat pipe to the central cavity.

12. The device as claimed in claim 1, wherein at least a portion of the rotor and at least a portion of the heat pipe are vacuum-insulated.

13. The device as claimed in claim 1, wherein the refrigerant is a mixture of neon and argon or a mixture of neon and nitrogen.

14. The device as claimed in claim 3, wherein the refrigeration unit has a regenerative cryogenic cooler.

15. The device as claimed in claim 14, wherein the regenerative cryogenic cooler comprises at least one cooler selected from the group consisting of a pulse tube cooler, a split Stirling cooler, and a Gifford-McMahon cooler.

16. The device as claimed in claim 15, wherein the cold head is a multistage cold head.

17. The device as claimed in claim 16, wherein the cold head has two refrigeration stages, with the first stage being thermally connected to an electricity supply or to a radiation shield, and the second stage being thermally connected to the condenser.

18. The device as claimed in claim 17, wherein the cold head maintains superconducting winding at a temperature of below 77 K.

19. The device as claimed in claim 18, wherein the superconducting winding is formed from a metallic low-$T_c$ superconductor material or a metal-oxide high-$T_c$ superconductor material.

20. The device as claimed in claim 19, wherein the heat pipe has a dripping edge which projects into the lateral cavity or the central cavity.

21. The device as claimed in claim 20, wherein the lateral cavity widens from the heat pipe to the central cavity.

22. The device as claimed in claim 21, wherein the refrigerant is a mixture of neon and argon or a mixture of neon and nitrogen.

* * * * *